US005489379A

United States Patent [19]

Meenan et al.

[11] Patent Number: 5,489,379

[45] Date of Patent: Feb. 6, 1996

[54] APPARATUS FOR FILTERING SOLUTION

[75] Inventors: Sean G. Meenan, Plainview; Richard C. Stoyell, Jr., Moravia, both of N.Y.

[73] Assignee: Pall Corporation, East Hills, N.Y.

[21] Appl. No.: 272,215

[22] Filed: Jul. 8, 1994

[51] Int. Cl.[6] ............................ B01D 35/05; B01D 36/00

[52] U.S. Cl. ........................ 210/167; 210/196; 210/242.1; 210/488; 210/493.5

[58] Field of Search .................................... 101/363, 364, 101/366, 147, 148; 210/805, 242.1, 167, 172, 194, 196, 197, 248, 323.2, 340, 416.1, 435, 483, 488, 493.1, 493.5, 503

[56] References Cited

U.S. PATENT DOCUMENTS

| | | | |
|---|---|---|---|
| 4,009,657 | 3/1977 | Bonanno et al. | 101/366 |
| 4,574,695 | 3/1986 | Ryan | 101/148 |
| 4,608,158 | 8/1986 | Ghisalberti et al. | 210/96.1 |
| 4,615,800 | 10/1986 | Stifelman et al. | 210/340 |
| 4,671,869 | 6/1987 | Hara et al. | 210/119 |
| 5,152,890 | 10/1992 | Linnersten | 210/315 |
| 5,252,207 | 10/1993 | Miller et al. | 210/335 |

FOREIGN PATENT DOCUMENTS

WO9411082 5/1992 WIPO .

OTHER PUBLICATIONS

Baldwin Circulating Water Levels; Filters and Filter Elements.

Pall Process Filtration Company/Industrial Processing Group, "Lithographic Printing–Fountain Solution" (1993, 1994), 2 pages.

*Primary Examiner*—Robert A. Dawson
*Assistant Examiner*—Robert James Popovics
*Attorney, Agent, or Firm*—Leydig, Voit & Mayer

[57] ABSTRACT

The disclosure describes an apparatus for treating fountain solution which comprises a recirculation assembly and a microporous filter assembly. The recirculation assembly disconnected between the outlet and inlet of a fountain solution tray of a printing system. The recirculation assembly includes a fountain solution sump and a return line which extends from the outlet of the fountain solution tray to the sump. The microporous filter assembly is positioned in the sump or in the return line and includes a filter position across a fountain solution flow path and having a removal rating of at least about 99.98% at about 20 microns or finer.

11 Claims, 4 Drawing Sheets

APPARATUS FOR FILTERING SOLUTION

FIELD OF THE INVENTION

This invention pertains to methods and apparatus for treating fountain solutions used in printing systems. In particular, the present invention provides a method and apparatus for filtering fountain solution through a microporous filter assembly.

BACKGROUND OF THE INVENTION

Many printing systems, such as an offset lithographic printing system, require the use of an aqueous based composition commonly known as dampening fluid or fountain solution. In offset lithography the printing system includes a print plate, and the printing portion of the print plate is ink receptive and fountain solution repellent. Conversely, the blank portion of the print plate is fountain solution receptive and ink repellent. When the print plate contacts rollers wet with ink and rollers wet with fountain solution, the fountain solution coats the blank portion of the plate while the ink coats the image portion of the plate. Wetting the blank portion with fountain solution helps prevent printing ink from adhering to blank portions of the print plate.

Within the printing system, fountain solution is collected in one or more fountain solution reservoirs, commonly called trays. One or more rollers positioned in the tray transfers the fountain solution from the tray to a print plate. A circulation system is used to recirculate fountain solution from a fountain solution outlet of each tray to a sump and back through a fountain solution inlet to each tray of the printing system, and the fountain solution is conditioned for reuse as it is circulated. The most common means of driving the fountain solution from the fountain solution trays to the sump is by gravity feed or gravity-assisted feed, while a pump returns the fountain solution from the sump back to the fountain solution trays of the printing system. Circulation systems are available from Dahlgren USA, Inc. of Carrollton, Tex., Baldwin Dampening Systems, a Baldwin Technology Company, of Naugatuck, Conn. and Royse Manufacturing Company of Dallas, Tex.

It is well known in the printing industry that as fountain solution becomes contaminated with particulates, particularly microparticulates, the print quality deteriorates. Sharp quality print runs depend to a large degree on a relatively contaminant free fountain solution. However, contamination of fountain solution is inevitable. The most common fountain solution contaminants are microparticulates from the printing ink and print paper, as well as the ambient environment. During or after extensive print runs, the fountain solution was typically replaced, due to the buildup of microparticulate contaminants in the fountain solution.

Until recently there has been little incentive to filter fountain solution. In some instances, simple sponge filters or disposable bag filters were used, but these filters function principally to protect the sump pump from large debris. Industry followed the practice that fountain solution, being mostly water with inexpensive additives, could be replaced on a fairly regular basis.

New environmental awareness as well as stringent disposal codes, however, have created the need for a system to filter the recirculating fountain solution so that it is maintained relatively contaminant free. For example, in many localities the spent fountain solution is classified as hazardous waste. The practice of frequently discarding and replacing the solution has therefore become cost prohibitive.

Fountain solution filtration systems currently employed include sponge filters, panel filters (see U.S. Pat. No. 4,671,869) or packed beds (see U.S. Pat. No. 4,608,158). Unfortunately, these systems do not offer the degree of filtration needed to prolong the life of fountain solution from days to several weeks. Furthermore, panel filters and packed beds require special housings and fittings and require significant down time for replacement. The special housings and fittings represent expensive capital costs relative to the profit margins present in printing operations.

There is a need then for a filter system that effectively removes microparticulate contaminants from recirculating fountain solution, preferably a system that can be placed in line with minimal additional hardware or housings. Furthermore, there is a need for a filter system that exhibits a high removal rating for microparticulates, has a long life, and is designed to operate under gravity feed or gravity-assisted feed conditions.

SUMMARY OF THE INVENTION

In accordance with one aspect of the invention, apparatus are provided for treating fountain solution which recirculates between the fountain solution outlet and the fountain solution inlet of the trays of a printing system.

Accordingly, the present invention provides an apparatus for treating fountain solution which comprises a recirculation assembly and a microporous filter assembly. The recirculation assembly may be connected between the outlet of the fountain solution tray and inlet of the fountain solution tray of the printing system and operates to circulate fountain solution from the outlet of the fountain solution tray through the recirculation assembly to the inlet of the fountain solution tray of the printing system. The recirculation assembly includes a fountain solution sump and a return line which extends from the outlet of the fountain solution tray to the sump. The microporous filter assembly is positioned in the sump of the recirculation assembly or in the return line between the outlet of the fountain solution tray and the sump. The microporous filter assembly includes at least one hollow, cylindrical filter cartridge which includes the filter. The return line of the recirculation assembly includes a flexible conduit connected to the filter cartridge. The filter cartridge is free to float on a surface of the fountain solution or sink beneath the surface of the fountain solution in the fountain solution sump. The filter has a removal rating of at least about 99.98% at about 20 microns or finer.

The present invention also provides a method for treating fountain solution comprising directing the fountain solution from the outlet of the fountain solution tray along a fountain solution return line to a fountain solution sump. The method further includes filtering the fountain solution along the return line or within the sump by directing the fountain solution through a microporous filter assembly which includes a filter positioned across a fountain solution flow path and having a removal rating of at least about 99.98% at about 20 microns or finer. Further, the method comprises returning the filtered fountain solution from the sump to the inlet of the fountain solution tray of the printing system.

DETAILED DESCRIPTION OF EXEMPLARY EMBODIMENT

Figure 1:
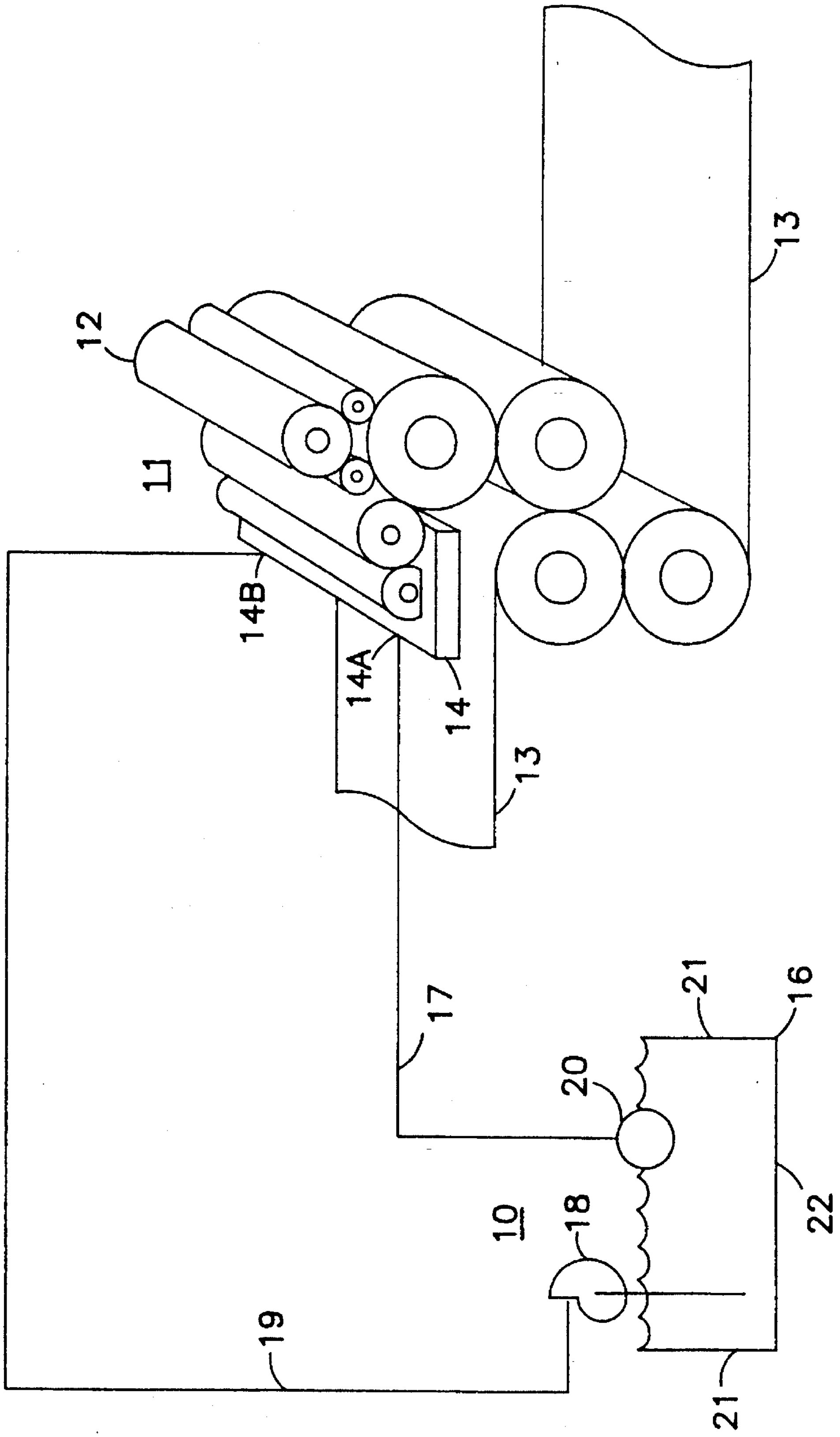
FIG. 1 depicts an apparatus for treating fountain solution according to one embodiment of the invention.

As shown in FIG, 1, one example of an embodiment of the present invention generally comprises a recirculation assembly 10 connected to a printing system 11. Printing systems are well known in the art and typically comprise various rollers 12 for transferring an image onto paper 13. Fountain solution utilized in the printing process is collected in one or more fountain solution reservoirs 14, commonly known as fountain solution trays, and at least one roller 12 is positioned in each tray 14 and is used to transfer the fountain solution to a print plate.

The recirculation assembly 10 serves to recirculate the fountain solution between an outlet 14A and an inlet 14B associated with the trays 14 of the printing system 11 and to treat the fountain solution for continued use within the printing system 11. The recirculation assembly 10 may include a fountain solution reservoir 16, such as a sump, and a return line 17 extending from the outlet 14A of one or more trays 14 of the printing system 11 to the sump 16. Various drive mechanisms may be used to direct the fountain solution from the outlet 14A of the trays 14 along the return line 17 to the sump 16. In one embodiment, the drive mechanism is no more than a gravity feed established between the outlet 14A of the trays 14 and the sump 16. For example, the sump 16 may be located as much as about 5 feet or more below the trays 14, preferably about 2 to 3 feet or less. In another embodiment, the drive mechanism may be a gravity-assisted feed, for example, a gravity feed assisted by a vacuum return jet (not shown). In a further embodiment, a pump (not shown) may be coupled in the return line 17 and used to drive the fountain solution from the outlet 14A of the trays 14 to the sump 16. In any of these embodiments, a pump 18 located in the sump 16 may be used to pump the fountain solution from the sump 16 along a feed line 19 to the inlet 14B associated with the trays 14 of the printing system 11. In one embodiment, the inlet 14B simply comprises an open portion of the tray 14 and the feed line 19 feeds the fountain solution through the open portion into the tray 14.

To treat the fountain solution for reuse, the recirculation assembly may include a cooling unit (not shown) coupled to the sump 16 to lower the temperature of the fountain solution coming from the printing system 11. The fountain solution is typically warmed by the rollers 12 and it is often preferable to cool the fountain solution before it is returned to the printing system 11.

In accordance with one aspect of the invention, a filter assembly 20 is positioned across a fountain solution flow path in the return line 17 leading to the sump 16 or in the sump 16, and the fountain solution entering or contained in the sump 16 is treated for reuse by directing the fountain solution through the filter assembly 20 and removing microparticulates from the fountain solution. The filter assembly 20 may be inserted anywhere along the return line 17. Alternatively, the filter assembly may be positioned in the sump 16, for example, at the inlet to the pump 18. Preferably, the filter assembly is positioned at the end of the return line 17 so fountain solution from the printing system 11 flows along the return line 17, through the filter assembly 20, and into the sump 16. Most preferably, the return line 17 is a flexible conduit, and the filter assembly 20 is attached to the end of the flexible conduit and is free to float on the surface or sink below the surface of the fountain solution in the sump 16. Alternatively, the filter assembly 20 may be fixedly mounted above the surface of the fountain solution in the sump 16 or below the surface of the fountain solution in the sump 16, for example, along the walls 21 or the base 22 of the sump 16.

The filter assembly may be configured in a wide variety of ways. For example, the filter assembly may include a housing comprising an impervious body having an inlet and an outlet and a filter element positioned in the impervious body between the inlet and the outlet. The filter element may be in the form of a flat disk or a solid cylinder, where the inlet of the housing communicates with one end face of the filter element while the outlet of the housing communicates with the other end face of the filter element. Alternatively, the filter element may be in the form of a hollow cylinder, where the inlet and the outlet of the housing respectively, communicate with the exterior and the interior, or the interior and the exterior, of the filter element.

Figure 2:
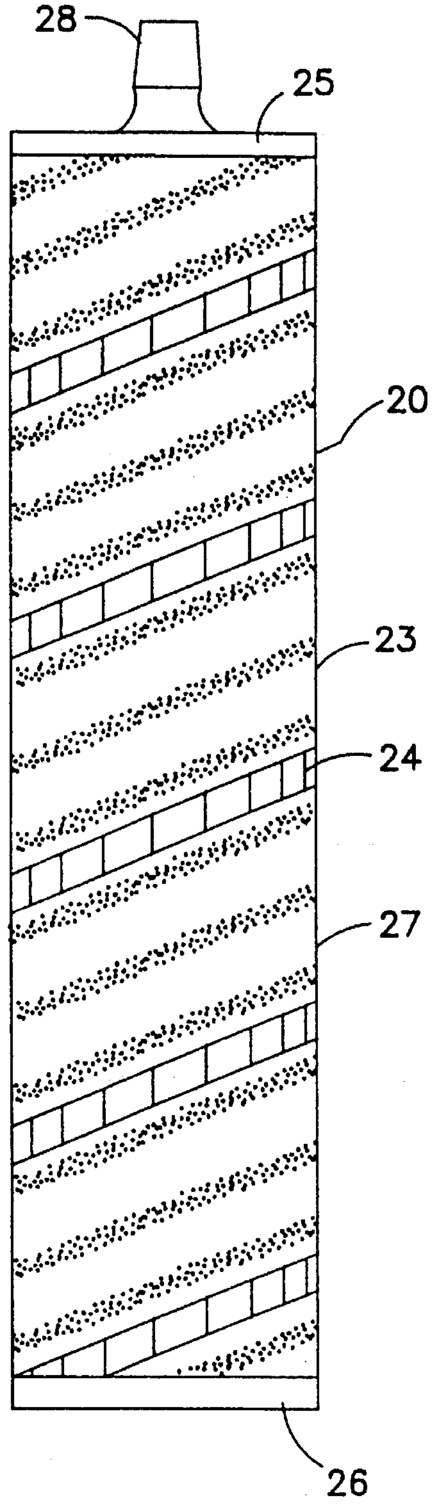
FIG. 2 shows a filter element for the apparatus of FIG. 1.

Preferably, the filter assembly comprises one or more hollow filter cartridges. The filter cartridge can be variously configured, as disclosed, for example, in U.S. Pat. No. 5,252,207 which is incorporated by reference. As shown in FIG. 2, the filter cartridge 23 may generally comprise a filter element 24 extending between and bonded to first and second end caps 25, 26, preferably an open end cap 25 and a blind end cap 26. The filter cartridge 23 may further include a wrap 27 wound around the outer periphery of the filter element 24. A perforated core (not shown) and/or a perforated cage (not shown) may extend between the end caps 25, 26 along the inner and outer peripheries, respectively, of the filter element 24 to provide additional structural support to the filter cartridge 23.

In a particularly preferred embodiment of the invention, the open end cap 25 of the filter cartridge 23 includes a connector 28, such as a hose barb. The end of the return line 17 is attached to the open end cap 25 at the hose barb connecter 28 and the filter cartridge 23 is positioned directly in the sump 16, for example, where it floats on the surface or sinks below the surface of the fountain solution. Fountain solution contaminated with microparticulates is directed from the printing system 11 along the return line 17 through the open end cap 25 into the interior of the filter cartridge 23. From the interior of the filter cartridge 23, the fountain solution flows inside out through the filter element 24, where the microparticulates are removed. In this embodiment, there is no impervious housing structure between the filter element 24 and the walls 22 of the sump 16, so the fountain solution flows through the filter element 24 directly into the fountain solution in the sump 16. This embodiment is particularly advantageous because it eliminates the need for a filter housing and any special hardware, such as a removable cover, associated with a filter housing. Not only does this significantly reduce capital costs, but it speeds change-out of the filter cartridge 23 once the filter element 24 fouls.

In accordance with another aspect of the invention, the filter assembly preferably has a low resistance to flow of fountain solution through the filter assembly. One of the most reliable, and least expensive, mechanisms for driving the fountain solution from the fountain solution trays 14 of the printing system 11 to the sump 16 is a simple gravity feed. This minimizes the hardware necessary to drive the fountain solution into the sump 16, but it provides a relatively small force for establishing a suitable fountain solution flow rate from the trays 14 into the sump 16. Suitable flow rates may be as much as about 15 GPM or more, although flow rates of about 3 GPM or less, e.g., about 1.5 GPM or less, are also suitable. To ensure that a gravity feed provides a suitable flow rate, the flow resistance of the filter assembly is preferably very low.

Figure 5:
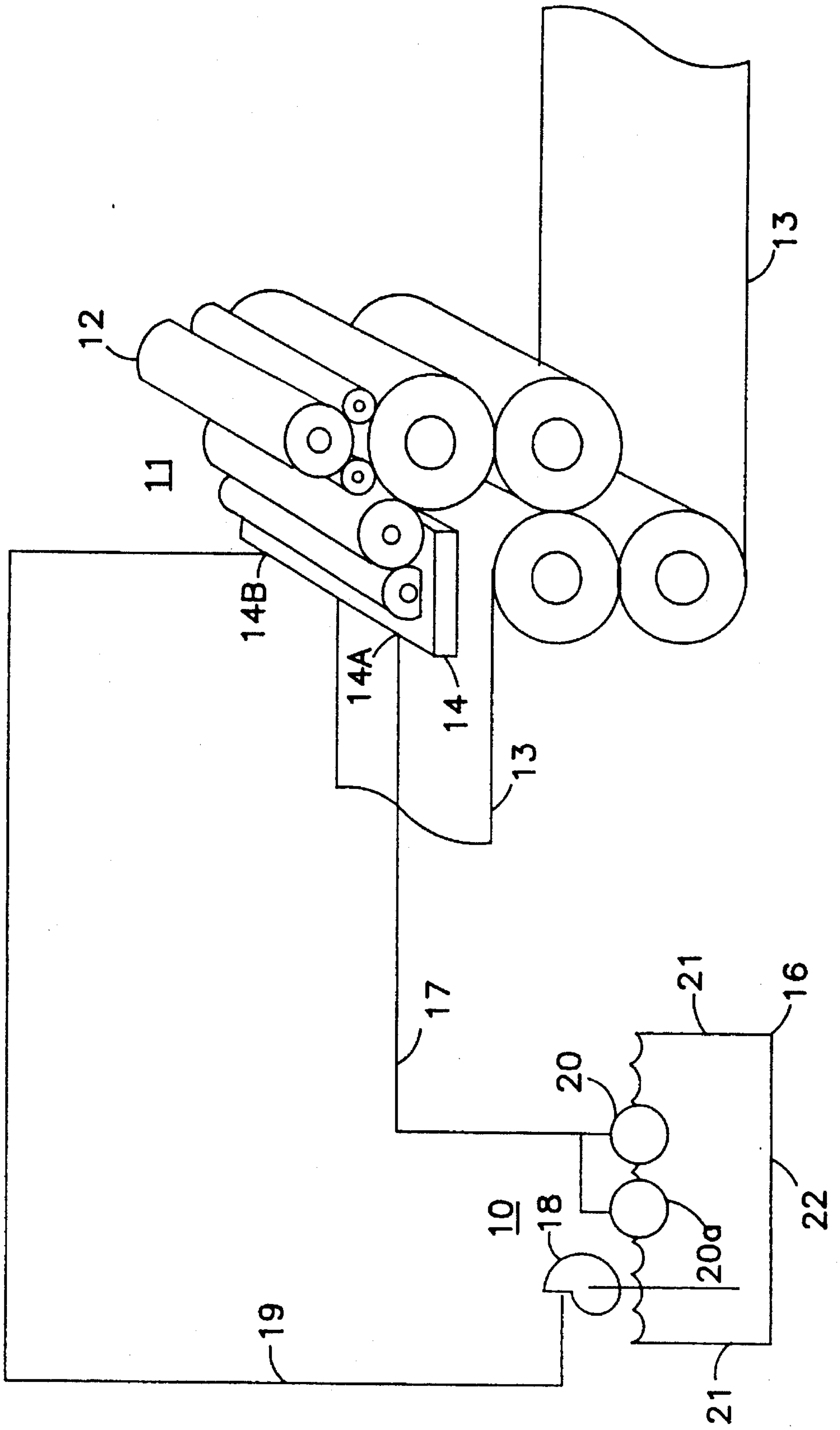
FIG. 5 depicts an apparatus for treating fountain solution according to another embodiment of the invention.

One measure of flow resistance commonly used in the industry is the clean pressure drop in PSI/GPM for a ten inch filter cartridge. A microporous filter cartridge used in the present invention preferably has a clean pressure drop no greater than about 0.10 PSI/GPM per ten inch cartridge. More preferably, the clean pressure drop is less than or equal to about 0.05 PSI/GPM per ten inch cartridge and, most preferably, less than or equal to about 0.03 PSI/GPM per ten inch cartridge, e.g., about 0.025 PSI/GPM or less per ten inch cartridge. By using a microporous filter cartridge with such a low resistance to fountain solution flow, an adequate flow rate between the trays and the sump may easily be established using only a gravity feed or a gravity assisted feed. In other embodiments of the invention, the resistance to flow could be lowered by joining two or more filter cartridges in parallel, as shown in FIG. 5 with filter cartridges 20 and 20*a*. Alternatively, a pump may be used to drive the fountain solution from the trays to the sump. However, both of these alternative embodiments involve additional hardware and further complexity and, therefore, are less desirable than a filter assembly which consists of a single microporous filter cartridge having a low flow resistance.

A wide variety of filter elements are suitable for use with the present invention. For example, the filter element may include a filtration medium comprising a porous film or membrane; a porous fibrous structure, such as a non-woven web, a fibrous sheet or a fibrous mass; and/or a porous woven structure such as a woven web or screen. Further, the filtration medium may have a uniform or graded pore structure and may comprise one or more layers, each having the same or different filtering characteristics. In addition to a filtration medium, the filter element may further include additional components such as a support and drainage material and/or a cushioning material disposed between the support and drainage material and the filtration medium. The filter element may be pleated or non-pleated.

In accordance with a further aspect of the invention, the filter element is microporous. For example, the filter element may have a removal rating in a single pass of at least about 99.98% at about 20 microns in accordance with the modified Oklahoma State University F-2 Test Procedure discussed, for example, in U.S. Pat. No. 4,925,572. A removal rating of 99.98% at 20 microns is approximately equivalent to a removal rating of about 90% at about 11 microns. More preferably, the filter element has a removal rating in a single pass of at least about 99,98% at about 10 microns, which is approximately equivalent to a removal rating of about 90% at about 4–6 microns. A microporous filter element having a removal rating of about 99.98% at about 10 microns yields clearly superior results. It has been discovered that if the fountain solution is kept relatively free from particles as small as about 10 micrometers to about 1 micrometer, the fountain solution continues for an extended period of time to wet only the blank portion of the print plate, ensuring a crisp print image.

Figure 3:
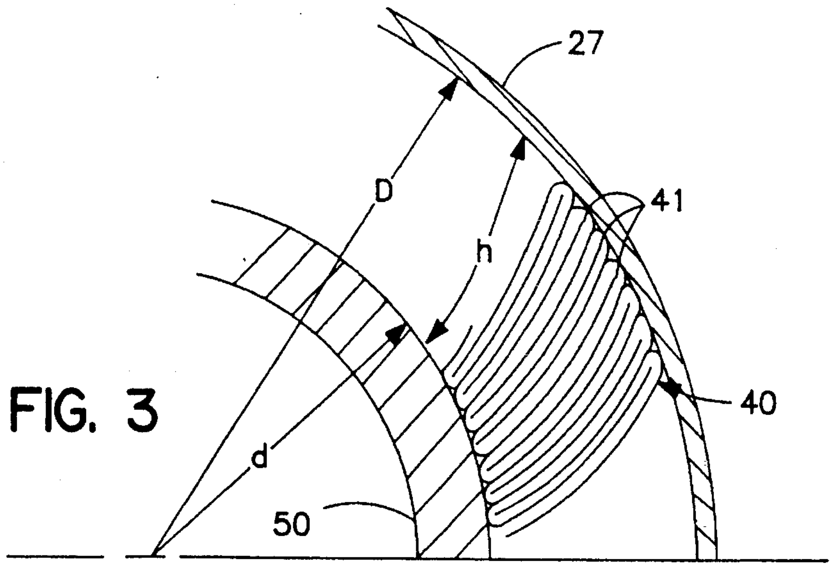
FIG. 3 is an enlarged cross sectional view of a portion of the filter of FIG. 2.
Figure 4:
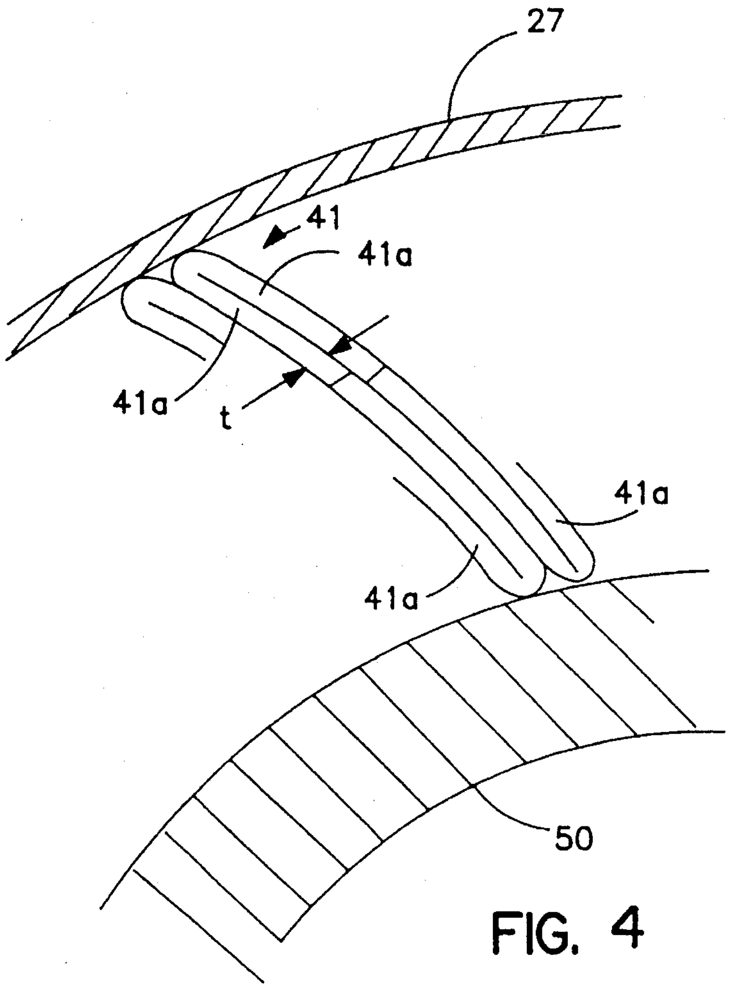
FIG. 4 illustrates an enlarged cross sectional view of one of the pleats of FIG. 3.

In a preferred embodiment, the filter element comprises a cylindrical, pleated, multilayer structure including an inner upstream support and drainage material, such as a polymeric mesh; a filtration medium comprising upstream and downstream melt blown, non-woven, polypropylene webs having removal ratings of about 99.98% at 20 microns and 10 microns, respectively; and an outer downstream support and drainage layer also comprising an extruded polymeric mesh. The filter element is configured in a laid-over pleat arrangement and is helically wrapped with a porous non-woven polymeric web which is bonded to the filter element, as disclosed in International Publication No. WO 94/11082 and depicted in FIGS. 3 and 4. FIGS. 3 and 4 depict a cross sectional view of pleats 41, core 50 and wrap 27. The condition illustrated in FIGS. 3 and 4 in which the surfaces of the legs 41a of the pleats 41 are in intimate contact and which the height H of each pleat 41 is greater than the distance between the inner and outer peripheries of the filter element 40 (i.e., [D-d]2 in FIG. 3) is referred to as a laid-over state. In the laid-over state, pleats may extend, for example, in an arcuate or angled fashion or in a straight, non-radial direction, and there may be substantially no empty space between adjacent pleats, and virtually all of the volume between the inner and outer peripheries of the filter element 40 may be occupied by the filter element 40 and can be effectively used for filtration.

The opposing surfaces of adjoining legs 41*a* of the pleats need not be in intimate contact over the entire axial length of the filter element 24, but the greater the length in the axial direction of the region of intimate contact, the more effectively used is the space between the inner and outer periphery of the filter element 24. Therefore, adjoining legs 11*a* are in intimate contact over a continuous region which preferably extends for at least approximately 50%, more preferably at least approximately 75%, and most preferably, approximately 95–100% of the axial length of the filter element 24. The filter element, having a pleat height of about 0.83 inches and an outer diameter of about 2.5 inches, is formed around a perforated core having an outer diameter of about 1.3 inches. The opposite ends of the filter element and the core are bonded to polymeric ends caps, as shown in FIG. 2, to form the filter cartridge.

This preferred filter cartridge is particularly advantageous because it combines a very fine removal rating, i.e., about 99.98% at 10 microns, with a very low flow resistance, i.e., a clean pressure drop of about 0.03 PSI/GPM per 10 inch cartridge. For many filter assemblies, the resistance to flow through the filter increases with the fineness of the filter. Consequently, to obtain a filter assembly having a low flow resistance, the filter may be relatively coarse. However, the preferred filter cartridge provides both a fine removal rating and a low flow resistance, so it may be very effectively used to filter microparticulates from fountain solution, even at low driving pressures. For example, five gallons per minute of fountain solution were recirculated by a recirculation assembly from two fountain solution trays of a six-color sheet feed press through the preferred filter cartridge to a sump and then returned to the press. The conductivity of fresh, new fountain solution is typically between 1,000 and 1,400 micro mhos, where the conductivity of the fountain solution is a conventional measure of its suitability. After two weeks of circulating the fountain through the preferred filter cartridge, the conductivity of the fountain solution increased only to about 2,000 micro mhos. When the fountain solution was recirculated through the press without a microporous filter element, the fountain solution was discarded once a week when the conductivity of the fountain solution was in the range from about 2,500 to 3,000 micro mhos.

We claim:

1. An apparatus for treating fountain solution for a printing system which includes at least one fountain solution tray having an outlet and an inlet, the apparatus comprising:

a recirculation assembly connectable between the outlet of the fountain solution tray and the inlet of the fountain solution tray of the printing system and operable to circulate fountain solution from the outlet of the fountain solution tray through the recirculation assembly to the inlet of the fountain solution tray of the printing system, the recirculation assembly including a fountain solution sump and a return line extending from the fountain solution tray of the printing system to the fountain solution sump of the recirculation assembly, and a microporous filter assembly disposed in the fountain solution sump of the recirculation assembly or in the return line between the outlet of the fountain solution tray of the printing system and the fountain solution sump of the recirculation assembly, the microporous filter assembly including at least one hollow, cylindrical filter cartridge which includes the filter, the return line of the recirculation assembly including a flexible conduit connected to the filter cartridge and the filter cartridge is free to float on a surface of the fountain solution or sink beneath the surface of the fountain solution in the fountain solution sump, the filter having a removal rating of at least 99.98% at about 20 microns or finer.

2. The fountain solution treating apparatus of claim 1 wherein the return line of the recirculation assembly is connected to the cylindrical filter cartridge to direct fountain solution into the hollow interior of the cylindrical cartridge and radially outwardly across the filter through the filter cartridge.

3. The fountain solution treating apparatus of claim 2 wherein the filter cartridge has a clean pressure drop less than or equal to about 0.10 PSI/GPM per 10 inch cartridge.

4. The fountain solution treating apparatus of claim 3 wherein the filter is pleated and has a removal rating of at least about 99.98% at 10 microns and wherein the filter cartridge has a clean pressure drop less than or equal to about 0.03 PSI/GPM per 10 inch cartridge.

5. The fountain solution filtering apparatus of claim 4 wherein the filter comprises a multilayer composite including an upstream and downstream polymeric mesh and a polymeric fibrous filter medium disposed between the upstream and downstream polymeric mesh, the composite being pleated in a laid over configuration.

6. The fountain solution filtering apparatus of claim 2 wherein the return line includes a flexible conduit connected to the filter cartridge and the filter cartridge is free to float on the surface or sink beneath the surface of the fountain solution in the fountain solution sump.

7. The fountain solution filtering apparatus of claim 2 wherein the filter cartridge comprises a first filter cartridge and the filter assembly further includes a second hollow, cylindrical filter cartridge in fluid communication with the return line in parallel with the first filter cartridge.

8. The fountain solution treating apparatus of claim 1 wherein the filter cartridge has a clean pressure drop less than or equal to about 0.10 PSI/GPM per 10 inch cartridge.

9. The fountain solution treating apparatus of claim 8 wherein the filter is pleated and has a removal rating of at least about 99.98% at 10 microns and wherein the filter cartridge has a clean pressure drop less than or equal to about 0.03 PSI/GPM per 10 inch cartridge.

10. The fountain solution filtering apparatus of claim 9 wherein the filter comprises a multi-layer composite including an upstream and downstream polymeric mesh and a polymeric fibrous filter medium disposed between the upstream and downstream polymeric mesh, the composite being pleated in a laid-over configuration.

11. The fountain solution filtering apparatus of claim 1 wherein the filter cartridge comprises a first filter cartridge and the filter assembly further includes a second hollow, cylindrical filter cartridge in fluid communication with the return line in parallel with the first filter cartridge.

* * * * *